(12) United States Patent
Nakamura et al.

(10) Patent No.: US 8,257,449 B2
(45) Date of Patent: Sep. 4, 2012

(54) METHOD FOR MANUFACTURING NIOBIUM SOLID ELECTROLYTIC CAPACITOR

(75) Inventors: Hidenori Nakamura, Tokyo (JP); Yoshinori Shibuya, Tokyo (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 13/056,569

(22) PCT Filed: Jul. 28, 2009

(86) PCT No.: PCT/JP2009/063403
§ 371 (c)(1),
(2), (4) Date: Mar. 8, 2011

(87) PCT Pub. No.: WO2010/013701
PCT Pub. Date: Feb. 4, 2010

(65) Prior Publication Data
US 2011/0154632 A1    Jun. 30, 2011

(30) Foreign Application Priority Data
Jul. 29, 2008   (JP) .................................. 2008-194400

(51) Int. Cl.
*H01G 9/00* (2006.01)
*H01G 9/04* (2006.01)
*H01G 9/145* (2006.01)
(52) U.S. Cl. ..................... 29/25.03; 438/381; 361/528
(58) Field of Classification Search ............... 29/25.03; 438/381, 393; 361/523, 524, 528
See application file for complete search history.

(56) References Cited

U.S. PATENT DOCUMENTS

| | | | |
|---|---|---|---|
| 6,215,652 B1 | 4/2001 | Yoshida et al. | |
| 6,850,406 B2 | 2/2005 | Asami et al. | |
| 2003/0142465 A1 | 7/2003 | Asami et al. | |
| 2008/0259527 A1* | 10/2008 | Kobayashi et al. | 361/524 |
| 2008/0297982 A1* | 12/2008 | Umemoto et al. | 361/524 |
| 2009/0231782 A1* | 9/2009 | Fujita et al. | 361/525 |
| 2011/0154632 A1* | 6/2011 | Nakamura et al. | 29/25.03 |

FOREIGN PATENT DOCUMENTS

| | | |
|---|---|---|
| JP | 04-274312 A | 9/1992 |
| JP | 10-223483 A | 8/1998 |
| JP | 11-150041 A | 6/1999 |
| JP | 11-329902 A | 11/1999 |
| JP | 2000-012396 A | 1/2000 |
| JP | 2000-068159 A | 3/2000 |
| JP | 3965300 B2 | 6/2007 |
| WO | 2007/020969 A1 | 2/2007 |

\* cited by examiner

*Primary Examiner* — Alexander G. Ghyka
*Assistant Examiner* — Stanetta Isaac
(74) *Attorney, Agent, or Firm* — Sughrue Mion, PLLC

(57) ABSTRACT

The present invention relates to a method for producing a niobium solid electrolytic capacitor using niobium as an anode body, which comprises a step of chemically converting the anode, wherein the chemical conversion step comprises a first chemical conversion step of forming a chemical conversion coating of the anode, a step of heating the anode body having been subjected to the first chemical conversion step, and a second chemical conversion step of once again chemically converting the heated anode body; wherein electrolytic chemical conversion is performed in the first chemical conversion step and the second chemical conversion step using a chemical conversion liquid, which contains a metal nitrate salt as an electrolyte, at a temperature from 40° C. to the boiling point of the solvent; and wherein the heating step is performed at a temperature of 150 to 300° C. The method for producing a niobium solid electrolytic capacitor of the present invention can increase the stability of an oxide film which functions as a dielectric body and prevent increase in leakage current, thereby improving the yield and reliability in the method for producing a niobium solid electrolytic capacitor.

7 Claims, No Drawings

METHOD FOR MANUFACTURING NIOBIUM SOLID ELECTROLYTIC CAPACITOR

TECHNICAL FIELD

The present invention relates to a method for producing a solid electrolytic capacitor using niobium as a valve-acting metal material (anode body). Specifically, the present invention relates to a method for producing a niobium solid electrolytic capacitor, which has improved stability of the oxide film functioning as a dielectric body formed on the surface of a niobium porous sintered body as an anode body; prevents increase in the leakage current of a solid electrolytic capacitor as a final product; and has improved yield and reliability.

BACKGROUND ART

A solid electrolytic capacitor comprises an anode body, a dielectric body (oxide film) and a cathode and generally has a structure in which an oxide film as a dielectric layer is formed on the surface of a valve-acting metal material as an anode material and a solid electrolyte layer as a cathode is formed thereon.

Conventionally, an aluminum (Al) foil and a tantalum (Ta) sintered element have been widely used as an anode material for a solid electrolytic capacitor. An oxide film is formed on the surface of the anode material by chemical formation, which oxide film functions as a dielectric layer of an electrolytic capacitor.

A method for forming a chemical conversion coating on an Al film is described, for example, in the standards by Electronic Industries Association of Japan "Test method of an electrode foil for an aluminum electrolytic capacitor" (EIAJ/RC-2364A; revised in March, 1999).

A method for forming a chemical conversion coating on a Ta sintered element is described in the standards by Electronic Industries Association of Japan "Test method of a tantalum sintered element for a tantalum electrolytic capacitor" (EIAJ/RC-2361A; revised in February 2000).

As a method for chemical conversion to improve stability of an oxide film, for example, JP-A-H10-223483 (Patent Document 1) describes a chemical conversion method by dipping an aluminum foil in an aqueous solution containing phosphoric acid, boric acid, organic acid or a salt thereof and applying voltage to the foil. JP-A-2000-12396 (Patent Document 2) describes a method for chemical conversion for a Ta sintered body in the presence of an oxidizing agent such as perchloric acids and salts thereof or chromic acid and salts thereof.

Also, JP-A-2000-68159 (WO 99/65043 publication) (Patent Document 3) describes carrying out chemical conversion of a cut surface of an aluminum chemical conversion foil by dipping the foil in an electrolytic solution containing acid such as phosphoric acid, oxalic acid and sulfuric acid and applying voltage to the aluminum bullion as an anode.

Compared to these methods, when niobium (Nb) is used as a valve-acting metal for an anode material, a satisfactory chemical conversion coating cannot be obtained under the same conditions as in the case using Al and Ta.

Nb is a metal having very similar chemical properties to those of Ta and a number of advantages such as a lower specific gravity, larger reserves, higher relative permittivity of an oxide film and lower price compared to Ta. Thus attempts have been made to use niobium as a material for electrolytic capacitors. However, only few researches have been actually made on a niobium electrolytic conversion coating on the assumption that it is similar to a tantalum electrolytic conversion coating since niobium has property values similar to those of Ta, and a satisfactory niobium solid electrolytic capacitor has not yet been available in the market.

Some of the causes for this problem are that the Nb chemical conversion coating is unstable as a dielectric body, has a larger leakage current (LC) than Ta, and exhibits a sensitive irreversible characteristic change against a thermal load. Particularly, in a reflow soldering heat treatment at a temperature of about 200 to 260° C. in a reflow furnace, the alteration of the chemical conversion coating caused even in a short period of the treatment may greatly affect on the capacitor performance.

As one means to solve the problem, JP-A-H11-329902 (U.S. Pat. No. 6,215,652 specification) (Patent Document 4) describes making a chemical conversion coating containing nitrogen by nitriding treatment (300° C.; under nitrogen atmosphere). However, the capacitance of the formation film varies still greatly and a satisfactory performance has not been achieved.

Japanese Patent No. 3965300 (U.S. Pat. No. 6,850,406 specification) (Patent Document 5) focuses on the fact that the cause of the bias dependency of the Nb solid electrolytic capacitor lies in a Nb lower oxide in an amorphous Nb oxide film and describes performing chemical cleaning in addition to nitriding treatment before re-chemical formation but does not describe removal of the treatment liquid after the chemical cleaning or re-chemical formation. When water washing is performed, one can easily expect on commonsense grounds that it will generate additional lower niobium oxide. Accordingly, it is assumed that the method cannot remove the lower niobium oxide completely and the method does not contribute to the decrease of the leakage current, which is an objective of the present invention.

PRIOR ART DOCUMENTS

Patent Documents

Patent Document 1: JP-A-H10-223483 publication
Patent Document 2: JP-A-2000-12396 publication
Patent Document 3: JP-A-2000-68159 publication (International publication No. WO 99/65043)
Patent Document 4: JP-A-H11-329902 publication (U.S. Pat. No. 6,215,652 specification)
Patent Document 5: Japanese Patent No. 3965300 publication (U.S. Pat. No. 6,850,406 specification)

DISCLOSURE OF THE INVENTION

Problem to be Solved by the Invention

Thus, an objective of the present invention is to increase the stability of an oxide film which functions as a dielectric body and prevent increase in leakage current, thereby improving the yield and reliability in the method for producing a niobium solid electrolytic capacitor.

Means to Solve the Problem

As a result of intensive studies, the present inventors have found that the problem can be solved by forming a chemical conversion coating as a dielectric layer on the surface of the Nb metal by electrolysis under the conditions of using a chemical conversion liquid, which contains metal nitrate salt as an electrolyte, at a temperature higher than 40° C.; and by performing the second chemical conversion after the first chemical conversion followed by heat treatment. The present inventors have accomplished the present invention based on this finding.

That is, the present invention provides a method for producing a Nb solid electrolytic capacitor as follows:

[1] A method for producing a niobium solid electrolytic capacitor using niobium as an anode body, which comprises a step of chemically converting the anode, wherein the chemical conversion step comprises a first chemical conversion step of forming a chemical conversion coating of the anode, a step of heating the anode body having been subjected to the first chemical conversion step, and a second chemical conversion step of once again chemically converting the heated anode body; wherein electrolytic chemical conversion is performed in the first chemical conversion step and the second chemical conversion step using a chemical conversion liquid, which contains a metal nitrate salt as an electrolyte, at a temperature from 40° C. to the boiling point of the solvent; and wherein the heating step is performed at a temperature of 150 to 300° C.

[2] The method for producing a niobium solid electrolytic capacitor as described in [1] above, wherein the metal element of the metal nitrate salt is magnesium, aluminum, manganese, cobalt, zirconium, lanthanum or bismuth.

[3] The method for producing a niobium solid electrolytic capacitor as described in [2] above, wherein the metal element of the metal nitrate salt is aluminum.

[4] The method for producing a niobium solid electrolytic capacitor as described in [1] above, wherein the concentration of the metal nitrate salt electrolyte is 0.01% to the saturating amount.

[5] The method for producing a niobium solid electrolytic capacitor as described in [1] above, wherein the solvent is water.

[6] The method for producing a niobium solid electrolytic capacitor as described in [1] above, wherein a chemical conversion liquid used in the second chemical conversion step is the same as the one used in the first chemical conversion step.

Effects of the Invention

The present invention enables improving the performance of the conventional Nb solid electrolytic capacitor by decreasing the leakage current and improving the thermal stability. The present invention is characterized by the increase in the capacitance as well.

Such effects can be attained by increasing the temperature of the chemical conversion, thereby forming a stable oxide film which is dense and has few defects on the surface of Nb, and by repairing the defects generated by the heat treatment through the second chemical formation treatment, thereby forming a solid dielectric film.

MODE FOR CARRYING OUT THE INVENTION

The present invention is explained in more detail below.

The valve-acting metal used in the present invention is a porous sintered Nb. The porous sintered Nb is produced according to the conventional method. That is, a binder is added to the Nb powder and mixed to improve moldability. The Nb mixed powder having a lead wire for the anode device (generally a Nb wire) inserted into the powder is press-molded in a given shape. Next, the molded body is sintered by the heat treatment in high vacuum ($10^{-4}$ Pa or less) at 1000 to 1400° C., thereby forming a Nb porous body and cooling the Nb porous body in vacuum.

In the embodiment of the present invention, a dielectric layer (oxide film) is formed on the Nb porous sintered body in a chemical conversion liquid containing metal nitrate salt. Furthermore, a solid electrolytic layer as a cathode is formed to come into close contact with the dielectric layer having been formed in the previous step by a known method. Next, after sequentially forming a carbon layer and a conducting layer onto the solid electrolyte layer, the Nb sintered body is joined to a lead frame which functions as an external electrode and a jacketing portion such as epoxy resin is formed, thereby fabricating a Nb solid electrolytic capacitor.

The method for producing a Nb solid electrolytic capacitor is characterized in the chemical conversion step of forming a dielectric body.

The chemical conversion step of valve-acting metal is usually performed by using an aqueous solution (electrolytic solution) of mineral acid such as sulfuric acid, nitric acid, phosphoric acid and boric acid, organic acid such as oxalic acid and adipic acid, alkali metal salt thereof and ammonium salt, which are an electrolyte. Some of these electrolytic solutions cannot be used continuously for a long period of time because of the reduction in electrical conductivity due to the decomposition and evaporation of the electrolyte. Although the aqueous solution of nitric acid is an excellent electrolytic solution having high electrical conductivity, it is severely deteriorated with time and is unfit for use as it is.

As a result of studies, the present inventors have found that the current can be suppressed, thereby making the leakage current of an electrolytic capacitor very small, by the electrolytic formation treatment of forming a dielectric layer on the Nb porous sintered body, which uses a metal nitrate salt as an electrolyte and is performed by a first chemical conversion step, a step of heating the anode body having been subjected to the first chemical conversion step, and a second chemical conversion step of once again chemically converting the heated anode body, under the condition that the chemical conversion step is performed at a temperature from 40° C. to the boiling point of the solvent and the heating step is performed at a temperature of 150 to 300° C. It is assumed to be due to the adsorption of the metal cation onto the surface of the dielectric body so as to neutralize the nitric acid ion which is taken in the dielectric layer. As an ion to be absorbed, preferred is a metal ion which is capable of keeping the niobium oxide stable without dissolving it.

That is, in chemical conversion treatment of the present invention, a nitrate salt with metal other than alkali metal is preferably used as an electrolyte. More preferably, nitrate salt selected from zirconium nitrate, bismuth nitrate, lanthanum nitrate, cobalt nitrate, magnesium nitrate, manganese nitrate, aluminum nitrate and the like is used as an electrolyte. Among these nitrate salts, aluminum nitrate is particularly preferable.

The metal nitrate salt as an electrolyte is dissolved in a solvent for use. Examples of the solvent include organic solvent and water, and in view of stability and the boiling point, water is easiest to handle and preferable. The concentration of the electrolyte may be within the range such that chemical conversion can be practically performed. However, the higher concentration of the electrolytic solution enables efficient chemical conversion operation owing to high electric conductivity and low content of solution resistance component. On the other hand, the lower concentration of the electrolytic solution makes the cleaning after the chemical conversion easier. For this reason, the electrolyte concentration is preferably from 0.01 mass % to the saturating concentration, and about 1 mass % is optimum. However, if the saturating amount of the electrolyte is always used, the electrolyte concentration stays almost unchanged, which would be an advantage that the chemical conversion can be performed constantly under the same conditions.

With respect to the chemical conversion temperature of the valve-acting metal, the valve-acting metal has a temperature-dependent property that the lower chemical conversion temperature results in a larger leakage current. Therefore, the chemical conversion of Nb in the present invention is performed preferably at a temperature exceeding 40° C. and up to the boiling point of the solvent. Since the chemical conversion at a high temperature decreases the capacitance of the capacitor due to the diffusion of oxygen in the chemical conversion film, it is most preferable to perform the chemical conversion in the vicinity of 80° C.

Electric conditions for the chemical conversion include formation voltage and formation current. These conditions can be appropriately selected depending on the target withstand voltage of the electrolytic capacitor. The formation current is preferably within the range from 0.1 mA/g to 1.0 A/g. For example, when the powder having a capacitance of 50,000 to 150,000 µFV/g, the formation current is preferably from 100 mA/g to 400 mA/g in view of the capacitance, and most preferably about 200 mA/g. When the voltage reaches a predetermined level provided with constant current (CC), the chemical conversion is performed in constant voltage mode. The chemical conversion is to be performed until the current stabilizes. While the current as low as possible is desirable, it is advisable from a practical viewpoint to perform the chemical conversion till the current becomes lower than 1/20 of the initial current or to adopt the chemical conversion time of several hours.

In the present invention, after cleaning the element having been subjected to the chemical conversion step, the element is subjected to the heat treatment. The heating step is required so as to remove moisture and to make the chemical conversion coating solid. The heat treatment has an effect of removing the nitrate ion having infiltrated into a dielectric film as well. The ions taken into a dielectric film encourages the generation of lower niobium oxide and degrades insulation. The heating treatment temperature may be 100° C. or higher. Since the heating treatment at a too high temperature promotes the damage of the chemical conversion film excessively, it is desirable to perform the heating treatment at a temperature from 150° C. to 300° C., and most preferably around 250° C., which is the actually attained temperature in a general reflow furnace. The heating treatment time may be within the range so that the film stability can be maintained, but preferably from 10 minutes to two hours, and most preferably from 20 to 30 minutes.

In the present invention, the second chemical conversion treatment is performed after the heating treatment. That is, the second chemical conversion is performed for the purpose of newly forming an oxide film onto the lattice defects in which nitrate ions have dropped off by the heating treatment, thereby repairing the damaged film. The chemical conversion is performed under the condition of using the chemical conversion solution within the same temperature range and the composition range as in the first chemical conversion treatment, and the chemical conversion time may be the time period until the current stabilizes. The second chemical conversion treatment has the effect of newly forming a dielectric layer on the bare metal under the damaged portion of the dielectric layer as well as the effect of allowing the metal salt in the chemical conversion liquid to precipitate as an oxide by the leak current from the damaged portion, thereby interrupting the current. The time for the second chemical conversion treatment is generally less than one hour, and the period of time for 20 to 30 minutes is preferable in most cases.

The element having been subjected to the first chemical conversion treatment, the heating treatment and the second chemical conversion treatment can be fabricated as an electrolytic capacitor through the steps of forming a cathode, applying a paste, bonding to the lead frame and encapsulating by known methods.

Examples of the cathode electrolyte forming a solid electrolyte includes an inorganic semiconductor of manganese dioxide and the like, an organic semiconductor of tetracyanoquinodimethane (TCNQ) complex salt and the like, and a conductive polymer of a compound having a thiophene skeleton, a compound having a pyrrole skeleton, a compound having a polycyclic sulfide skeleton, a compound having a furan skeleton, a compound having an aniline skeleton and the like. However, the material for forming a solid electrolyte will not be limited thereto.

The method of the present invention enables rapid performance estimation by evaluating electric properties of an element after the completion of chemical conversion. That is, the effects of the present invention can be evaluated by measuring the electric properties of the element by an impedance analyzer and a leakage current (LC) meter between the element having been subjected to chemical conversion as an anode and the platinum black electrode using 40 mass % sulfuric acid solution as a cathode.

EXAMPLES

The present invention is to be described hereinafter referring Examples and Comparative Examples, but the present invention will not be limited thereto.

Example 1

22 mg of the Nb fine powder having a CV product of 150,000 µFV/g was molded in a cube with a part of a Nb wire embedded in the center thereof. The molded product was sintered at $10^{-4}$ Pa or less for 30 minutes in a reduced pressure baking furnace at 1210° C. to thereby prepare a sintered body. An aqueous solution of 1.0 mass % of aluminum nitrate as a chemical conversion liquid was heated to 80° C. The sintered element was dipped in the solution and 200 mA/g of DC constant current was applied to the element as an anode. After the voltage was elevated to 20V, chemical conversion was performed for 2.0 hours with the voltage kept at the level. Next, after washing the element with water, the heat treatment was performed for 20 minutes in a drier at 250° C. After the element was cooled to room temperature, the second chemical conversion was performed using the above-mentioned chemical conversion liquid. The second chemical conversion was performed for 30 minutes.

After the element having been subjected to the chemical conversion was washed with water and dried, the element was dipped in an aqueous 40% sulfuric acid solution and subjected to the performance test of measuring the capacitance (CV value) and leakage current (LC value).

Comparative Example 1

Except that the heating treatment was performed for 30 minutes in a drier at 105° C., an element was produced in the same steps as in Example 1 to be subjected to a performance test.

Comparative Example 2

Except that the chemical conversion temperature was set to 30° C., an element was produced in the same steps as in Example 1 to be subjected to a performance test.

Example 2

Except that the temperature of the chemical conversion liquid was set to 50° C., an element was produced in the same steps as in Example 1 to be subjected to a performance test.

Example 3

Except for using an aqueous solution, which contains 1.0 mass % magnesium nitrate as an electrolyte, as a chemical conversion liquid, an element was produced in the same steps as in Example 1 to be subjected to a performance test.

Example 4

Except for using an aqueous solution of 0.01 mass % aluminum nitrate at 80° C. as a chemical conversion liquid, an element was produced in the same steps as in Example 1 to be subjected to a performance test.

Comparative Example 3

The sintered element produced by the same steps as in Example 1 was subjected to chemical conversion using a 1.0 mass % phosphoric acid aqueous solution as a chemical conversion liquid under conditions of 80° C. and 200 mA/g. After the chemical conversion, the element was produced by performing the heat treatment (250° C.) and the second chemical conversion (in a phosphoric acid aqueous solution) and the CV and LC values were measured.

Comparative Example 4

Except that the heating treatment was performed for 30 minutes in a drier at 105° C., an element was produced in the same steps as in Comparative Example 3 to be subjected to a performance test.

Comparative Example 5

An element was produced under the same conditions as in Example 1 except for using 1.0 mass % nitrate acid aqueous solution as a chemical conversion liquid and setting the chemical conversion temperature at 30° C.

When a nitrate acid aqueous solution was used, nitric acid was decomposed at 80° C. and therefore chemical conversion could not be performed.

Comparative Example 6

Except for using an 8 mass % ammonium adipate aqueous solution as a chemical conversion liquid, an element was produced in the same steps as in Comparative Example 3 to be subjected to a performance test.

Comparative Example 7

Except for performing the heat treatment by retaining the element in a heating furnace at 350° C. for 30 minutes, an element was produced in the same steps as in Example 1 to be subjected to a performance test.

The results of the performance test of measuring the capacitance (CV value) and leakage current (LC value) of the elements produced in Examples 1 to 4 and Comparative Examples 1 to 7 are shown in Table 1.

In Example 1 and Comparative Examples 2 and 5, the electric conductivity of the chemical conversion liquid was also measured before and after the first chemical conversion. The results are shown in Table 2.

TABLE 1

| | Electrolyte type | Chemical conversion temperature (° C.) | Heat treatment temperature (° C.) | CV value (µF V/g) | LC value (µA/g) | LC/CV conversion |
|---|---|---|---|---|---|---|
| Example 1 | 1.0 mass % aluminum nitrate aqueous solution | 80 | 250 | 175419 | 15.7 | $8.95 \times 10^{-5}$ |
| Comparative Example 1 | 1.0 mass % aluminum nitrate aqueous solution | 80 | 105 | 175100 | 43.6 | $2.49 \times 10^{-4}$ |
| Comparative Example 2 | 1.0 mass % aluminum nitrate aqueous solution | 30 | 250 | 223861 | 66.4 | $2.97 \times 10^{-4}$ |
| Example 2 | 1.0 mass % aluminum nitrate aqueous solution | 50 | 250 | 204427 | 30.5 | $1.49 \times 10^{-4}$ |
| Example 3 | 1.0 mass % magnesium nitrate aqueous solution | 80 | 250 | 174700 | 21.3 | $1.22 \times 10^{-4}$ |
| Example 4 | 0.01 mass % aluminum nitrate aqueous solution | 80 | 250 | 177421 | 25.5 | $1.44 \times 10^{-4}$ |
| Comparative Example 3 | 1.0 mass % phosphoric acid aqueous solution | 80 | 250 | 155907 | 29.2 | $1.87 \times 10^{-4}$ |
| Comparative Example 4 | 1.0 mass % phosphoric acid aqueous solution | 80 | 105 | 140604 | 44.5 | $3.16 \times 10^{-4}$ |
| Comparative Example 5 | 1.0 mass % nitric acid aqueous solution | 30 | 250 | 201562 | 72.5 | $3.59 \times 10^{-4}$ |
| Comparative Example 6 | 8 mass % ammonium adipate aqueous solution | 80 | 250 | 167501 | 83.7 | $5.00 \times 10^{-4}$ |

TABLE 1-continued

| | Electrolyte type | Chemical conversion temperature (° C.) | Heat treatment temperature (° C.) | CV value (μF V/g) | LC value (μA/g) | LC/CV conversion |
|---|---|---|---|---|---|---|
| Comparative Example 7 | 1.0 mass % aluminum nitrate aqueous solution | 80 | 350 | 156064 | 41.3 | $2.65 \times 10^{-4}$ |

TABLE 2

| | Chemical conversion liquid | Liquid temperature (° C.) | Electric conductivity after the first chemical conversion (compared to 100% before chemical conversion) |
|---|---|---|---|
| Example 1 | 1 mass % aluminum nitrate aqueous solution | 80° C. | 100% |
| Comparative Example 2 | 1 mass % aluminum nitrate aqueous solution | 30° C. | 100% |
| Comparative Example 5 | 1 mass % nitric acid aqueous solution | 30° C. | 55% |

As is clear from the measurement results in Table 1, the lower chemical conversion temperature increases the capacitance (CV) while the LC value tends to increase as well (Comparative Example 2). When the electrolyte types are compared, it was found that aluminum nitrate achieved the best results (Examples 1, 2 and 4). As is clear from the measurement results in Table 2, in the case where nitric acid was used for the chemical conversion at 30° C., the measurement shows that the electric conductivity is severely deteriorated with time and the chemical conversion liquid cannot be used continuously for a long period of time (Comparative Example 5). In the case of phosphoric acid, though the chemical conversion liquid is stable, the capacitance of the element becomes low, which is disadvantageous for designing a capacitor (Comparative Examples 3 to 4). The lower chemical conversion temperature increases the LC value (Comparative Example 2), and the LC values increases as well when the heat treatment temperature is too low (Comparative Example 1) while the capacitance decreases when the heat treatment temperature is too high (Comparative Example 7). The electric conductivity of the aluminum nitrate aqueous solution will not be deteriorated with time and can be used for a long period of time (Examples 1, 2 and 4).

The invention claimed is:

1. A method for producing a niobium solid electrolytic capacitor using niobium as an anode body, which comprises a step of chemically converting the anode, wherein the chemical conversion step comprises a first chemical conversion step of forming a chemical conversion coating of the anode, a step of heating the anode body having been subjected to the first chemical conversion step, and a second chemical conversion step of once again chemically converting the heated anode body; wherein electrolytic chemical conversion is performed in the first chemical conversion step and the second chemical conversion step using a chemical conversion liquid, which contains a metal nitrate salt other than alkali metal nitrate salt as an electrolyte, at a temperature higher than 40° C. to the boiling point of the solvent; and wherein the heating step is performed at a temperature of 150 to 300° C.

2. The method for producing a niobium solid electrolytic capacitor as claimed in claim 1, wherein the metal element of the metal nitrate salt is magnesium, aluminum, manganese, cobalt, zirconium, lanthanum or bismuth.

3. The method for producing a niobium solid electrolytic capacitor as claimed in claim 2, wherein the metal element of the metal nitrate salt is aluminum.

4. The method for producing a niobium solid electrolytic capacitor as claimed in claim 1, wherein the concentration of the metal nitrate salt electrolyte is 0.01% to the saturating amount.

5. The method for producing a niobium solid electrolytic capacitor as claimed in claim 1, wherein the solvent is water.

6. The method for producing a niobium solid electrolytic capacitor as claimed in claim 1, wherein a chemical conversion liquid used in the second chemical conversion step is the same as the one used in the first chemical conversion step.

7. The method for producing a niobium solid electrolytic capacitor as claimed in claim 1, wherein the metal element of the metal nitrate salt consists of a metal that is not an alkali metal.

* * * * *